United States Patent [19]

Ismert et al.

[11] Patent Number: 5,385,320

[45] Date of Patent: Jan. 31, 1995

[54] HOOK SHAPED PIPE HANGER

[75] Inventors: Joseph P. Ismert, Kansas City; Frank J. Julian, Cleveland, both of Mo.

[73] Assignee: Chieftain Corporation, Peculiar, Mo.

[21] Appl. No.: 122,781

[22] Filed: Sep. 16, 1993

[51] Int. Cl.⁶ .............................................. F16M 13/00
[52] U.S. Cl. ..................................... 248/62; 248/74.2; 248/74.3
[58] Field of Search ................ 248/58, 49, 60, 62, 248/63, 68.1, 74.2, 74.3, 316.7, 339, 304, 305, 306; 24/599.4, 600.7, 601.2, 601.6, 601.7

[56] References Cited

U.S. PATENT DOCUMENTS

| | | |
|---|---|---|
| 521,149 | 6/1894 | Boyd . |
| 525,891 | 9/1894 | Fricke . |
| 576,339 | 2/1897 | Clayton .................. 24/600.7 |
| 661,604 | 11/1900 | Grabler . |
| 1,320,828 | 11/1919 | Bilbrough .................. 248/32 X |
| 1,522,979 | 1/1925 | Ratigan .................. 24/600.7 X |
| 1,588,172 | 6/1926 | Crocker .................. 24/601.7 X |
| 1,804,472 | 5/1931 | Leslie . |
| 2,319,832 | 5/1943 | Trochim . |
| 2,570,957 | 10/1951 | Lee . |
| 2,665,950 | 1/1954 | Johnson .................. 24/600.7 X |
| 2,854,824 | 10/1958 | Curry et al. . |
| 2,862,368 | 12/1958 | Dempsey . |
| 3,016,220 | 1/1962 | Rose . |
| 3,136,515 | 6/1964 | Potruch . |
| 3,218,012 | 11/1965 | Volpe .................. 248/62 |
| 3,273,837 | 9/1966 | Willert et al. . |
| 3,279,300 | 10/1966 | Larson . |
| 3,355,132 | 11/1967 | Jenkins . |
| 3,430,905 | 3/1969 | Pepe . |
| 3,559,910 | 2/1971 | Babb . |
| 3,888,439 | 6/1975 | Tuttle . |
| 4,032,096 | 6/1977 | Perrault et al. ................ 248/74.3 X |
| 4,042,198 | 8/1977 | Takeuchi . |
| 4,254,930 | 3/1981 | Warren . |
| 4,260,123 | 4/1981 | Ismert . |
| 4,407,478 | 10/1983 | Hodges .................. 248/68 X |
| 4,588,152 | 5/1986 | Ruehl et al. . |
| 4,826,111 | 5/1989 | Ismert . |
| 4,840,334 | 6/1989 | Kikuchi .................. 248/74.2 X |
| 4,842,237 | 6/1989 | Wollar . |
| 4,903,920 | 2/1990 | Merritt . |
| 4,936,530 | 6/1990 | Wollar . |
| 4,961,554 | 10/1990 | Snowton . |
| 4,971,272 | 11/1990 | Gudridge et al. . |
| 4,978,090 | 12/1990 | Wichert et al. . |
| 5,054,741 | 10/1991 | Ismert . |

FOREIGN PATENT DOCUMENTS

| | | | |
|---|---|---|---|
| 0381413 | 1/1908 | France | .................. 24/600.7 |
| 0077295 | 1/1962 | France | .................. 24/601.7 |
| 2353055 | 10/1973 | Germany . | |
| 305003 | 1/1929 | United Kingdom . | |
| 1315952 | 5/1973 | United Kingdom . | |

OTHER PUBLICATIONS

"The Sioux Strap Tube Hanger" Sioux Chief Mfg. Co. p. 19 Clamps and Insulators pp. 10-11.

Primary Examiner—Karen J. Chotkowski
Attorney, Agent, or Firm—Stinson, Mag & Fizzell

[57] ABSTRACT

A pipe hanger is formed of an elongate stem joined to a flexible, curved, substantially semicircular lower hook portion. The stem has holes therethrough for nailing to a support beam and suspending a run of plumbing piping from the support beam. The hook portion is of commensurate size to the pipe and cradles the pipe in a suspended position. In a preferred embodiment, a tooth extending angularly, outwardly and downwardly from the portion of the stem adjacent to the hook portion cooperates with the hook tip so that there is a snap fit between the tooth end and the hook tip as the pipe is urged therebetween and into a retained, cradling relation in the hook portion. Several alternative embodiments are disclosed which utilize a tooth movable into position over the pipe to hold the pipe in a retained, cradling relation in the hook portion.

24 Claims, 3 Drawing Sheets

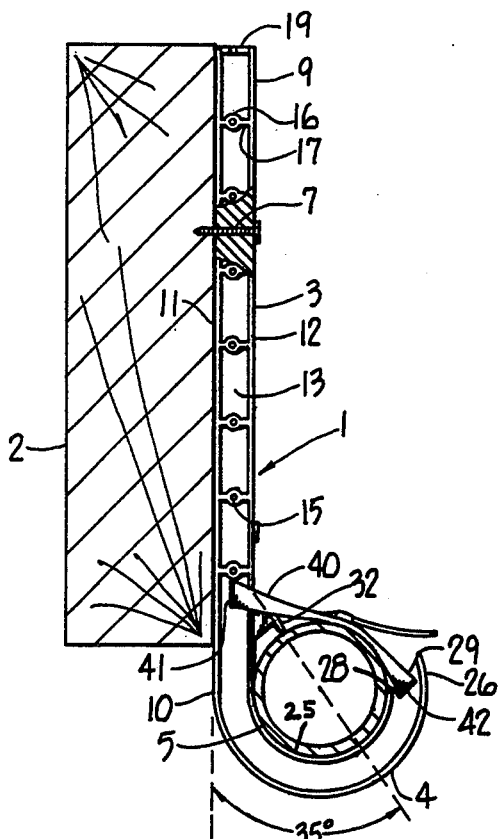
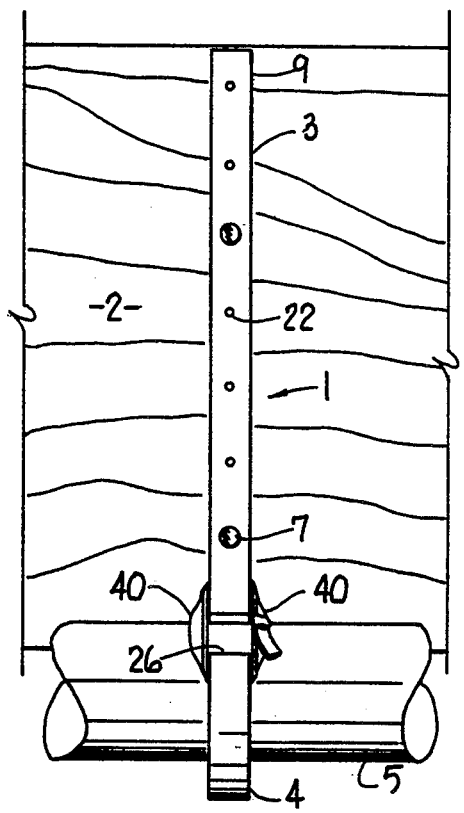
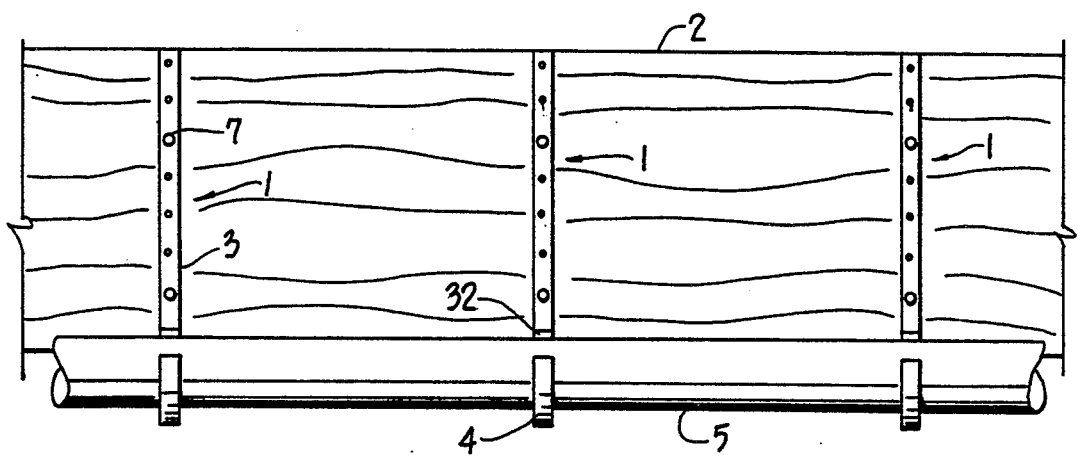

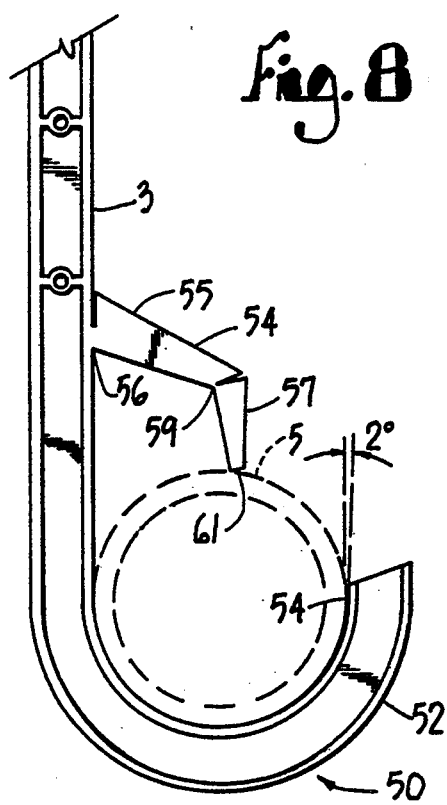
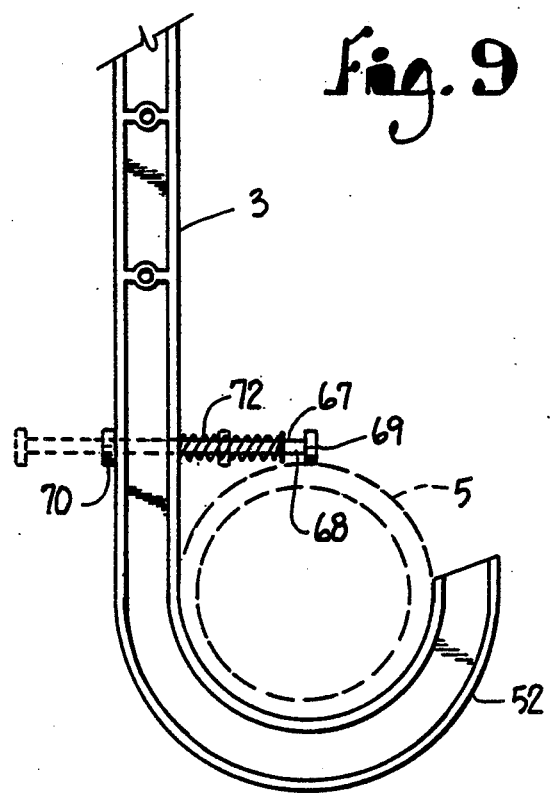
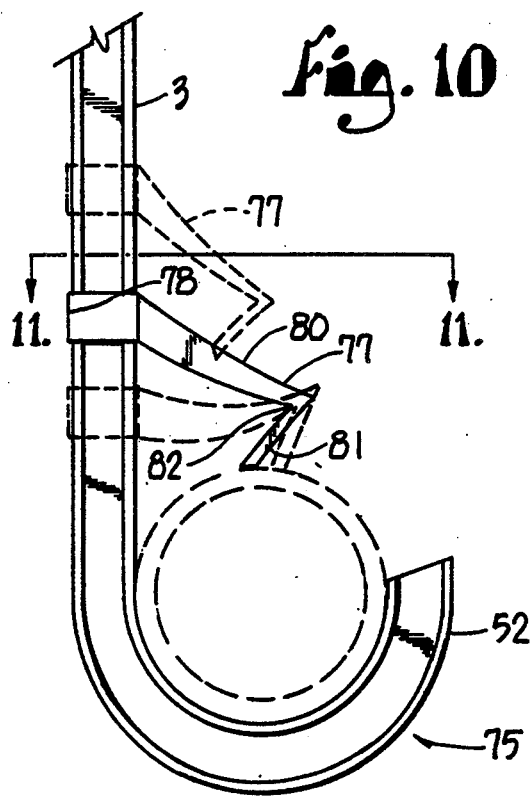
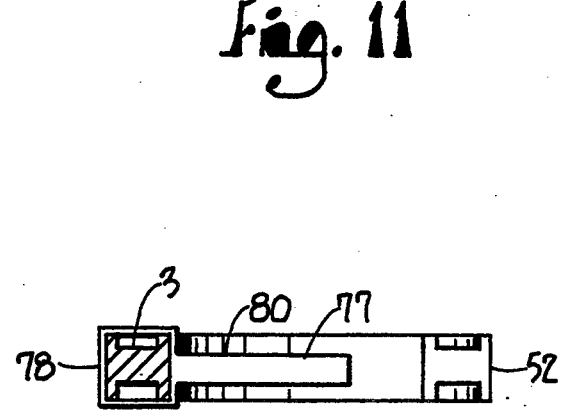

HOOK SHAPED PIPE HANGER

FIELD OF THE INVENTION

This invention relates to plumbing holders in general and specifically to a pipe hanger for affixing a pipe to a support structure.

BACKGROUND OF THE INVENTION

Pipes in residential and commercial plumbing installations need to be mounted to a support structure such as a wall or to an underfloor joist. Common installation areas include along walls, in attics, in crawl spaces, basements and in wall chases. These plumbing runs may be supply lines or drain, waste or vent piping, which are normally at a slight downward angle to allow water drainage. In the plumbing trade, pipes are often supported by the use of a strap hanger which consists of the length of a perforated galvanized metal strip which is bent around the pipe and nailed to an overhead support, such as an underfloor joist. The use of a strap hanger requires two hands and often presents an untidy appearance when installed. Suspending the supply piping allows for insulation or the additional flex required to absorb expansion and contraction. In drain and waste piping installations, various suspension devices allow for drainage pitch.

There have been manufactured various types of pipe hangers to take the place of the standard strap hanger. One of these, the J Hook (a trademark of J-Hook Industries, Inc.), disclosed in U.S. Pat. No. 4,409,428, provides a snap-in fitting caused by an overcenter extension of more than 180° of a hook tip area relative to a stem portion. The requisite flexible material of the hook portion provides the snap fit; however, this design is often unsuitable with heavy pipe because the weight of the pipe is sufficient to pull the hook portion downwardly to such extent that the pipe is in danger of falling from the hanger.

Other hanging methods used in the plumbing trade for supply or drain piping include formed metal hooks and clips, injected or extruded plastic hooks, straps, strapping and clamps.

SUMMARY OF THE INVENTION

The present invention provides a flexible, plumbing hanger hook which includes an upper stem to be nailed against a support structure such as an underfloor joist or against a wall. The stem extends downwardly into a hook portion which curves upwardly but does not extend beyond 180° of the pipe in a contacting relation. A downwardly extending angular tooth protrudes from the stem adjacent the hook portion and points generally toward the center of the hook portion. The distance between the hook tip and the end of the downwardly extending tooth is slightly less than the diameter of a selected pipe to be maintained by the plumbing pipe hanger so that there is a tight, snap fit between the hook tip and the tooth. The pipe is urged between the tooth tip and the hook end and maintained by the hook portion which is sized to accord with the diameter of the pipe. In alternative embodiments, a tooth is movable into position over the pipe to hold the pipe in a retained, cradling relation in the hook portion.

The hanger is preferably made of plastic, but may be of metal having portions of sufficient flexibility to engage the piping.

OBJECTS OF THE INVENTION

The objects of the present invention are: to provide a plumbing pipe hanger which is capable of suspending plumbing from a support; to provide such a plumbing pipe hanger in which the pipe is securely seated against inadvertent release; to provide such a plumbing pipe holder in which the pipe can be removed when desired for maintenance; to provide such a plumbing pipe holder with a hook portion that secures the pipe to it; to provide such a plumbing pipe holder which is made out of easily formed plastic and which is noncorrosive; to provide an improved plumbing pipe hanger which is designed to be strongly constructed to prevent the pipe from rolling out of the hanger upon loads being placed on the pipe; to provide an improved plumbing pipe hanger which may be used inverted; to provide an improved plumbing pipe hanger in which the pipe may be slid through the hanger; and to provide such a plumbing pipe holder which is economical to manufacture and readily adapted for the intended purpose.

Other objects and advantages of this invention will become apparent from the following description taken in connection with the drawings wherein are disclosed specific embodiments of the invention.

BRIEF DESCRIPTION OF THE DRAWINGS

FIG. 1 a fragmentary, side elevational view showing a plumbing hanger embodying the present invention secured to a joist and having a pipe mounted therein.

FIG. 2 is a front elevational view of the plumbing pipe hanger nailed to a joist.

FIG. 3 is a front elevational view of several plumbing pipe hangers nailed to a joist and supporting a run of pipe.

FIG. 8 is a side elevational view of a second alternative embodiment of the pipe holder.

FIG. 9 is a side elevational view of a third alternative embodiment of the pipe holder.

FIG. 10 is a side elevational view of a fourth alternative embodiment of the pipe holder.

FIG. 11 is a sectional view taken along lines 11—11, FIG. 10.

DETAILED DESCRIPTION OF THE INVENTION

Figure 4:
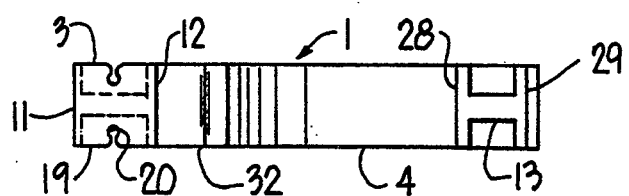
FIG. 4 is a top plan view of the plumbing pipe holder.

As required, detailed embodiments of the present invention are disclosed herein. It is, however, to be understood that the disclosed embodiments are merely illustrative of the invention, which may be embodied in various forms. Therefore, specific structural and functional details disclosed herein are not to be interpreted as limiting, but merely as providing the proper basis for the claims and as a representative basis for teaching one skilled in the art to employ the disclosed invention in virtually any appropriately detailed structure.

The reference numeral 1, FIG. 1, is generally directed to a plumbing pipe hanger embodying the present invention. The pipe hanger 1 is secured to a support 2, such as an underfloor joist, and is generally formed of a stem 3 and a hook portion 4, which receives and retains a pipe 5.

In greater detail, the pipe hanger 1 is secured to the side of a wall support or joist, such as a wooden underfloor joist having approximate measurements of 2″×6″ or 2″×8″. The hanger 1 may be secured so that the pipe runs parallel to the joist, as shown in FIG. 3, or runs perpendicular to the joist, as by turning the stem 90°. Fasteners, such as ring shank nails 7, secure the pipe hanger 1 to the support beam 2. The pipe hanger 1 is generally of a plastic material such as ABS or PVC, although metal could be used. The preferred material is PVC of such specifications that it can be glued, is UV resistant and fire retardant. The preferred material is designed to be self-extinguishing in the presence of fire.

The pipe hanger 1 is preferably in the shape of an "H" in cross-section, FIG. 4, and is molded in this form for conservation of material and for strength. The stem 3 portion includes an upper end 9 and a lower end portion 10 joining the lower hook portion 4. The "H" structure of the stem 3 provides opposite side flanges 11 and 12 and a central, connecting web 13. A plurality of nail holes 15 extend through the web 13 for nailing the pipe hanger 1 at a right angle to the support 2 (not shown). In the illustrated example, each of the nail holes 15 is reinforced by a molded bushing portion 16 with a connecting septum 17. The septa 17 may be omitted for all nail holes 15 except for the top hole and bushing portion 16 in order to elevate points of the nails 7 as described below. The bushing portion 16 rises level to the flanges 11 and 12 so that the nail 7 is not sunk down between the flanges 11 and 12.

Figure 5:
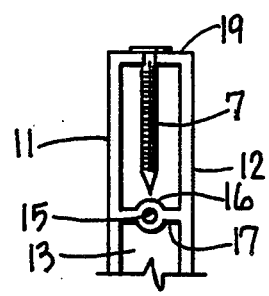
FIG. 5 is a fragmentary, detailed view of a top portion of the stem of the plumbing pipe holder.

A top cross flange 19 has opposed U-shaped slots 20 for receiving nails 7 so that the pipe hanger can be preloaded with nails in place and ready for use, FIG. 5. In this configuration, the worker would grasp the shank of the nail 7, pull it from its holder in the slots 20 and insert it into one of the nail holes for nailing to the support 2.

In addition to the nail holes 15 which extend through the web 13 and between the side flanges 11 and 12, there are also nail holes 22 which extend perpendicularly to the nail holes 15 and run through the side flanges 11 and 12 so that the pipe hanger 1 can be nailed as illustrated in FIG. 3 to support the pipe 5 extending parallel to the support 2.

As shown in FIG. 1, the stem 3 extends generally downwardly with the hook portion 4 preferably joined integrally with the stem 3. The side flange 12, as it extends into the hook portion 4, provides an inner surface 25, FIG. 6, with a radius of curvature of approximately the same as that of a pipe 5 of selected radius to be retained by the pipe hanger 1. For example, if the pipe 5 is a two-inch pipe, then the radius of curvature as defined by the inner surface 25 results in a dimension nominally greater than two inches so as to receive the pipe 5 in a cradling, snug fit. While the hook portion 4 has been described as a smoothly curving area having surface-to-surface contact with the cylindrical surface of the pipe, the hook portion 4 need merely cradle the pipe. To accomplish this, the hook portion 4 may be V-shaped, channel-shaped or otherwise polygonal. The side flange 11 curves about the inner surface 25 and maintains the same distance as the side flange 11 is from the side flange 12 in the area of the stem 3. The hook portion 4 terminates in a hook tip 26 with an inner area 28 meeting the inner surface 25 and an outer point 29 at the termination of the outer side flange 11.

Figure 6:
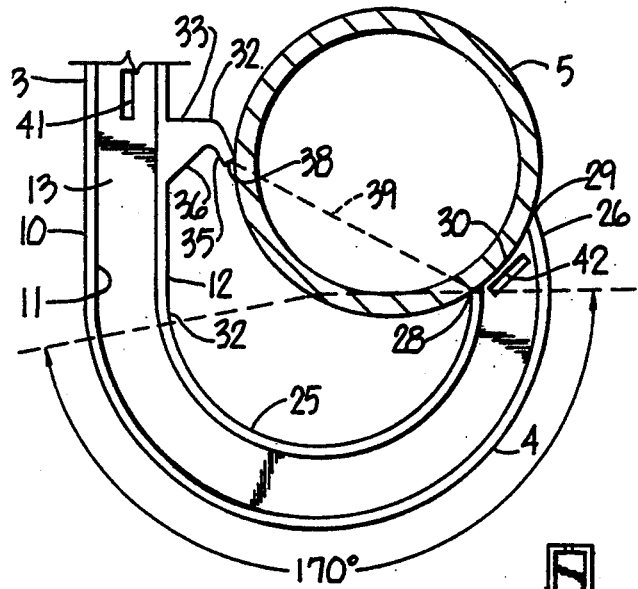
FIG. 6 is an enlarged, fragmentary, view of the plumbing pipe holder showing a snap fit relationship of the pipe into the hook portion.

Preferably, the hook tip 26 is arcuate or dished between the inner area 28 and the outer point 29 so that an arcuate surface 30 may cradle the pipe 5 during the pipe installation process, FIG. 6. The plumber may rest the pipe on the arcuate surfaces 30 of a line of pipe hangers 1, as in FIG. 3, while laying out the pipes or taking measurements.

The hook tip 26 is spaced from the stem lower end portion 10 a sufficient distance to snugly admit and retain the pipe 5. The exemplary hook portion inner surface 25 has a radius of curvature defining an arc from the stem lower end, as at 32, to the hook tip inner area 28 of 180° or less. In the example shown in FIG. 6, the preferred embodiment, the angular arc is 170°. With an inner surface arc of less than 180°, the hook portion 4 does not wrap about the pipe 5, but instead cradles without locking in the pipe 5.

Retention of the pipe 5 is provided by cooperation between a downwardly extending angular tooth 32 and the hook tip inner area 28. The tooth 32 is of particular configuration in order to optimally provide a snap fit entry and exit of the pipe 5 into the hook portion 4. In the illustrated example, the tooth 32 includes a flat, extension portion 33, FIG. 6, and a downwardly angled tooth tip 35. The tooth tip 35 is strengthened by an angle buttress 36. The tooth tip 35 is preferably positioned so that its axis is at an approximately 35°±2° included angle relative to the stem 3 and so that a center line of the tooth tip 35 extends through the circular center point of the hook portion 4, FIG. 1. The tooth tip 35 terminates in a square tip 38 which is preferably perpendicular to the center line of the tooth tip 35 and therefore tangent to, or flat against, the surface of the pipe 5 when it is received in the hook portion 4, FIG. 1.

Additionally, the distance from the tooth square tip 38 to the hook tip inner area 28 is preferably slightly less than the outside diameter of the pipe 5 to be installed. This relationship provides a tight, snap fit as the pipe 5 is inserted into the hanger 1. For example, a certain size of PVC piping commonly called a 2″ DWV, schedule 40 pipe, actually has an O.D. of 2.375″. Accordingly, the distance, represented by the line 39, between the tooth square tip 38 and the hook tip inner area 28, is 2.1″.

Pipes of other than 2″ nominal diameter may be used with the hanger 1 with the configuration, dimensions and relationship remaining in accord.

Preferably, the pipe hanger 1 is positioned in the relationship shown in FIGS. 1, 2 and 3. However, the pipe hanger 1 may be reversed relative to the support 2 so that the square bottom of the support rests against the flat extension portion 33. This mounting position would prevent the user from removing the pipe 5 from the hanger 1 without first dismounting the nailed stem 3 from the support 2. The pipe hanger 1 may also be inverted. The security of the pipe 5 when fitted into the hanger 1 is such that it is retained in the hanger regardless of orientation.

Another method of preventing ease of disconnection of the pipe 5 from the pipe hanger 1 is to use a strap tie 40 as shown in FIG. 1. The strap tie 40 is of the well known nylon lock type and is passed through slots 41 and 42 respectively extended through the stem 3 immediately upward of the tooth 32 and through the web 13 adjacent the hook tip 26.

Figure 7:
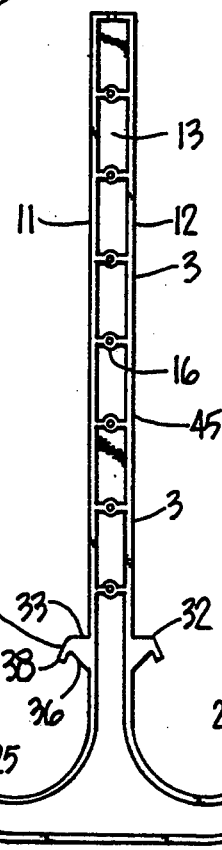
FIG. 7 is a side elevational view of an alternative embodiment of the pipe holder.

An alternative embodiment is displayed in connection with FIG. 7 wherein is shown a double hook version 45. The double hook version 45 is identical to the pipe hanger 1 with the exception that it includes oppositely extending hook portions 4 joined to a single stem 3. The use of the double hook 45 enables the plumber to hang two pipes parallel to each other from a single support joist 2.

It is believed that the pipe hanger 1 will be usually installed as shown in FIG. 3, e.g., with the stem 3 extending upwardly and the hook portion 4 downwardly. However, the disclosed hanger 1 offers particular advantage over many of the prior pipe hangers in that it is designed to be equally effective when used inverted. The arrangement of the tooth 32 relative to the pipe 5 allows for "upside down hanging" required when a pipe needs to be secured in tight, close relation to a beam extending parallel to the pipe 5. This arrangement is sometimes required at the beginning of the drainage system or due to various space limitations on supply or drain installations. The heavy weight of 3" and 4" nominal OD piping when loaded with water makes such pipe normally difficult to hang with commonly available pipe hangers; the difficulty is exacerbated when it is desired to invert the hanger for a tight, close mounting, as most prior pipe hangers will permit the pipe to disengage. In the present invention, the tooth 32 securely locks the pipe 5 in position, preventing escape due to expansion and contraction. In the preferred embodiment, the pipe 5, once installed in the hanger 1, is very difficult to remove. This feature enables the hanger 1 to be used equally well in either a normal or an inverted position.

A second alternative embodiment 50 is disclosed in FIG. 8 and includes a single stem 3 having holes therethrough for nailing as previously described. The stem 3 joins a hook portion 52 which, in the illustrated example, is semi-circular in shape and wraps about the outer cylindrical surface of a pipe 5 to be mounted in the hook 52. Similarly to the hook portion 4, the hook portion 52 has an inside diameter that does not extend beyond 180° of the circumference of the pipe. Rather, in the illustrated example, the hook portion 52 extends to approximately 180° and turns tangent to the line of curvature at point 54 to angle up and away at a 2° angle. This enables the pipe 5 to be snugly cradled in the hook portion 52 such that it can be readily lifted in or out of the hook portion 52. The second alternate embodiment 50 provides a hinged tooth 54 which extends outwardly from the stem 3 in the same relation as the tooth 32. In distinction, the hinged tooth 54 includes a first portion 55 joined to the stem 3 at an upward hinge 56 in the form of a bendable plastic portion with an upwardly extending slot so that the tooth 54 can be lifted slightly upwardly. Next, the first portion 55 is joined to a tooth tip 57 at a hinge 59. The hinge 59 is also in the form of a bendable plastic portion with a slot that extends outwardly, or toward the hook portion 52. The hinge 59 enables the tooth tip 57 to be bent or rotated upwardly, as does the hinge 56, so that access can be had into the hook portion 52. Like the tooth 32, the hinged tooth 54 has a square tip 61 to engage the surface of the pipe 5. Preferably, the second alternative embodiment pipe hanger 50 is made of molded plastic and is particularly sturdily constructed so that the hook portion 52 does not bend downwardly under the pressure of a loaded section of pipe 5. The hinged tooth 54 is integrally molded of the same plastic as the stem 3 and hook portion 52.

The tooth 54 is constructed so that the tip 57 flexes with respect to the tooth first portion 55, and both the tip 57 and the tooth first portion 55 flex relative to the stem 3. The hinges 56 and 59 permit flexure of the sections relative to each other, and the hinge 56 is stiffer, or more resistant, to flexure 8 than the hinge 59. In the preferred plastic material, the hinges 56 and 59 are formed by a thinning, creating a line of flexure serving as a hinge. The hinge 56, being thicker, is more resistant to flexure than the hinge 59. Upon entry of the pipe 5 into the hook portion 52, the entire hinged tooth 54 is depressed which causes the tooth first portion 55 to swing up faster than the tooth tip 57 before the tooth tip 57 swings outwardly. As shown in FIG. 8, the resultant position is with the tooth square tip 61 slightly off center and canted toward the stem 3 relative to a vertical radius line of the pipe 5.

Alternatively, the second alternative embodiment 50 could be constructed of metal or at least the hinged tooth 54 could be constructed of metal. Under these conditions, the material would not provide flexibility, but metal hinges such as provided by hinge frames could be pinned or otherwise affixed at the junctures to create flexible metal joints at the hinges 56 and 59.

The hinge action of the hinge tooth 54 provides that the hinge tooth 54 extends outwardly of the stem 3 not at the juncture of the hook portion arc and the stem 3.

A third alternative embodiment 65 is shown in connection with FIG. 9 wherein is disclosed a stem 3 and hook portion 52 substantially the same as that shown in connection with FIG. 8. However, the distinction for the third alternative embodiment 65 is that its tooth 67 is in the form of a spring loaded pin 68 with a first headed end 69 forming a tooth tip and a second headed end 70 which engages the rear surface of the stem 3 and prevents further outward extension. A coil spring 72 is sleeved about the pin 68 and biases the headed end 69 to the outward position shown in FIG. 9. In the position shown in FIG. 9, the headed end 69 is substantially over the vertical radius of a pipe 5 mounted within the hook portion 52 and prevents withdrawal of the pipe 5 from the hook portion 52. To remove the pipe 5, the headed end 69 of the pin 68 is pushed toward the stem 3 so that the pin 68 extends rearwardly, and the headed end 69 clears the circumference of the pipe 5. This construction can be all metal or a plastic stem and hook portion 3 and 52 with a metal pin 68 and a coil spring 72.

A fourth alternative embodiment 75 is shown in connection with FIGS. 10 and 11 wherein the stem 3 and hook portion 52 are the same as that shown in connection with FIGS. 8 and 9. The difference in the embodiment 75 over the other described embodiments is that it provides a tension hook tooth 77 which is slidably mounted for engagement with the pipe 5. The tension hook tooth 77 is movable up and down on a sleeve 78 which fits about the stem 3. A first spring leg 80 joins a second spring leg 81 in an acute included angle 82 of approximately 80°. The sleeve 78 is self-binding upon the stem 3 when the spring legs 80 and 81 are slid downwardly and in a position against the pipe 5. This system provides relatively ready removal of the pipe 5 from the pipe hanger. In the embodiment 75, the material forming the stem 3 and hook portion 52 can be metal or plastics either rigid or semi-rigid. The tension hook tooth 77 is preferably of spring steel or spring-like plastic.

In use, the installer mounts the pipe hanger in a suitable location with the hanger inverted or non-inverted. Pipe sections may be assembled by resting the sections on the hook end tips until ready, then the assembled sections can be snap-fitted into the hangers. Alternatively, the installer can snap in the pipe, loose of any couplings or fittings, then apply glue to the pipe and join it with the appropriate fittings by sliding the pipe through the hanger hook and into the glue hubs of the fittings. Once the pipe is snapped in, the angularly extending tooth acts as a check to prevent the pipe from heaving from expansion due to heat and escaping the hanger or from being pulled back out in any manner. The angular tooth substantially permanently locks in the pipe, preventing its escape due to expansion and contraction. It also allows for inverted installation without the use of strap ties. Because of the configuration of the disclosed pipe hanger, 3" and 4" OD size pipe does not escape an inverted pipe hanger under the weight of the pipe, providing a significant improvement over prior pipe hanger configurations.

Although certain embodiments of this invention have been illustrated and described, it should be understood that the scope of this invention is not limited thereto, except insofar as such limitations herein are included in the following claims.

What is claimed and desired to be secured by Letters Patent is as follows:

1. A pipe hanger comprising:
   a) an elongate stem joined to a lower hook portion of a cradle shape, said stem having holes therethrough for nailing to a support and having an upper end and with a lower end joining said hook portion at a hook juncture;
   b) said hook portion being sized to substantially cradle a pipe of selected radius to be retained by said hook portion, thereby providing said hook portion with a diameter;
   c) said hook portion terminating in a hook tip; and
   d) a tooth extending outwardly from said stem adjacent said stem lower end and tapering to a narrow tooth end terminating in a position above an area encompassed by said hook portion, said tooth being separate from said hook portion and with an open gap between said tooth tip and said hook juncture, said tooth end and a portion of said hook tip contacting said pipe being spaced a distance less than the diameter of said pipe so that there is a snap fit between said tooth end and said hook tip portion as said pipe is urged therebetween and into a retained, cradling relation in said hook portion.

2. The pipe hanger set forth in claim 1 wherein said tooth has a flat extension portion and a downwardly angled tip section joined to said first section 3. The pipe hanger set forth in claim 2 wherein said tooth has hinge portions respectively located between said flat extension portion and said stem and between said flat extension portion and said tip section.

4. A pipe hanger comprising:
   a) an elongate stem joined to a lower hook portion of a cradle shape, said stem having holes therethrough for nailing to a support and having an upper end and with a lower end joining said hook portion;
   b) said hook portion being sized to substantially cradle a pipe of selected radius to be retained by said hook portion, thereby providing said hook portion with a diameter;
   c) said hook portion terminating in a hook tip; and
   d) a tooth extending outwardly from said stem adjacent said stem lower end and having a tooth end terminating in a position above an area encompassed by said hook portion, said tooth end and a portion of said hook tip contacting said pipe being spaced a distance less than the diameter of said pipe so that there is a snap fit between said tooth end and said hook tip portion as said pipe is urged therebetween and into a retained, cradling relation in said hook portion, wherein said tooth extends from a sleeve slidable longitudinally on said stem, said tooth having a first section extending angularly downwardly from said slide and a tip section extending further downwardly.

5. The pipe hanger set forth in claim 4 wherein said tooth tip section is positioned in an acute included angle relative to said first section.

6. The pipe hanger set forth in claim 4 wherein said tooth is formed of a flexible, spring-like material.

7. The pipe hanger set forth in claim 4 wherein said sleeve is dimensioned to be self-binding on said stem.

8. A pipe hanger comprising:
   a) an elongate stem joined to a flexible, curved, substantially semicircular lower hook portion, said stem having holes therethrough for nailing to a support and having an upper end and with a lower end joining said lower hook portion at a hook juncture;
   b) said hook portion having an inner surface with a radius of curvature of approximately the same as that of a pipe of selected radius to be retained by said hook portion;
   c) said hook portion terminating in a hook tip with an inner area meeting said inner surface;
   d) said inner surface having a radius of curvature defining an arc from said hook juncture to said hook tip inner area of less than 180°;
   e) said hook tip inner area being spaced from said stem lower end a distance substantially the same as the diameter of the hook portion so that a pipe of substantially the same diameter is cradled in said hook portion; and
   f) a tooth extending outwardly and downwardly from said stem adjacent said stem lower end and tapering to a narrow tooth end terminating in a position above an area encircled by said hook portion, said tooth being separate from said hook portion and with an open gap between said tooth end and said hook juncture, said tooth end and said hook tip inner area being spaced a distance less than the diameter of said pipe so that there is a snap fit between said tooth end and said hook tip inner area as said pipe is urged therebetween and into a retained, cradling relation in said hook portion.

9. The pipe hanger set forth in claim 8 wherein a centerline extended through said tooth and running through a center point of said lower hook portion is at an approximately 35° included angle to said stem.

10. The pipe hanger set forth in claim 8 wherein said tooth has an upper flat shoulder joining said stem at a right angle for abutting a squared bottom support beam.

11. The pipe hanger set forth in claim 8 including apertures through said stem adjacent said tooth and through said hook portion adjacent said hook tip for extending a tie strap through said apertures and securing a pipe retained in said hook portion.

12. The pipe hanger set forth in claim 8 including a pair of the elements set forth in subparagraphs (b) through (f) with said hook portions extending in opposite directions for supporting a pair of pipes.

13. The pipe hanger set forth in claim 8 including a nail retainer slot for affixing a nail to said stem in ready position for use.

14. The pipe hanger set forth in claim 8 wherein said hook tip is slanted upwardly and away from said hook tip inner area to facilitate sliding a pipe into said hook portion.

15. A pipe hanger comprising:
 a) an elongate stem joined to a flexible, curved, substantially semicircular lower hook portion, said stem having a plurality of holes therethrough for nailing to a support and having an upper end and with a lower end joining said lower hook portion;
 b) said hook portion having an inner surface with a radius of curvature of approximately the same as that of a pipe of selected radius to be retained by said hook hanger;
 c) said hook portion terminating in a hook tip with an inner area meeting said inner surface, said hook tip being slanted upwardly and away from said hook tip inner area to facilitate sliding a pipe into said hook portion;
 d) said inner surface having a radius of curvature defining an arc from said stem lower end to said hook tip inner area of 180° or less;
 e) said hook tip inner area being spaced from said stem lower end a distance substantially the same as the diameter of the hook portion so that a pipe of substantially the same diameter is cradled in said hook portion; and
 f) a tooth extending outwardly and downwardly from said stem adjacent said stem lower end and having a tooth end terminating in a position above an area encircled by said hook portion, said tooth and said hook tip inner area being spaced a distance less than the diameter of said pipe so that there then is a snap fit between said tooth tip and said hook tip inner area as said pipe is urged therebetween and into a retained, cradling relation in said hook portion, said tooth being positioned relative to said stem so that a centerline extended through said tooth and running through a center point of said lower hook portion is at an approximately 35° included angle to said stem.

16. A pipe hanger comprising:
 a) an elongate stem joined to a lower hook portion of a cradle shape, said stem having holes therethrough for nailing to a support and having an upper end and with a lower end joining said hook portion;
 b) said hook portion being sized to substantially cradle a pipe of selected radius to be retained by said hook portion, thereby providing said hook portion with a diameter;
 c) said hook portion terminating in a hook tip; and
 d) a tooth extending outwardly from said stem adjacent said stem lower end and formed of a first section hingedly connected by a first hinge to said stem and a tip section hingedly connected by a second hinge to said first section, said first hinge between said stem and said first section being more resistant to flexure than said second hinge between said first section and said tip section, said tip section having a tooth end terminating in a position above an area encompassed by said hook portion, said tooth end and a portion of said hook tip contacting said pipe being spaced a distance less than the diameter of said pipe so that there is a snap fit between said tooth and said hook tip portion as said pipe is urged therebetween and into a retained, cradling relation in said hook portion.

17. A pipe hanger comprising:
 a) An elongate stem joined to a lower hook portion of a cradle shape, said stem having holes therethrough for nailing to a support and having an upper end and with a lower end joining said hook portion;
 b) said hook portion being sized to substantially cradle a pipe of selected radius to be retained by said hook portion, thereby providing said hook portion with a diameter;
 c) said hook portion terminating in a hook tip; and
 d) a tooth extending outwardly from said stem and mounted on a slidable sleeve movable in position adjacent said stem lower end, said tooth formed of a first portion extending angularly outwardly from said sleeve and a tip section extending angularly outward from said first section, said tip section having a tooth end terminating in a position above an area encompassed by said hook portion, said tooth end being slidable downwardly atop said pipe to maintain said pipe in a retained, cradling relation in said hook portion.

18. A pipe hanger comprising:
 a) an elongate stem joined to a flexible, curved, substantially semicircular lower hook portion, said stem having holes therethrough for nailing to a support and having an upper end and with a lower end joining said lower hook portion;
 b) said hook portion having an inner surface with a radius of curvature of approximately the same as that of a pipe of selected radius to be retained by said hook portion;
 c) said hook portion terminating in a hook tip with an inner area meeting said inner surface;
 d) said inner surface having a radius of curvature defining an arc from said stem lower end to said hook tip inner area of less than 180°;
 e) said hook tip inner area being spaced from said stem lower end a distance substantially the same as the diameter of the hook portion so that a pipe of substantially the same diameter is cradled in said hook portion;
 f) a tooth extending outwardly and downwardly from said stem adjacent said stem lower end and having a tooth end terminating in a position above an area encircled by said hook portion, said tooth end and said hook tip inner area being spaced a distance less than the diameter of said pipe so that there is a snap fit between said tooth end and said hook tip inner area as said pipe is urged therebetween and into a retained, cradling relation in said hook portion; and
 g) wherein a centerline extended through said tooth and running through a center point of said lower hook portion is at an approximately 35° included angle to said stem.

19. A pipe hanger comprising:
 a) an elongate stem joined to a flexible, curved, substantially semicircular lower hook portion, said stem having holes therethrough for nailing to a support and having an upper end and with a lower end joining said lower hook portion;
 b) said hook portion having an inner surface with a radius of curvature of approximately the same as that of a pipe of selected radius to be retained by said hook portion;
 c) said hook portion terminating in a hook tip with an inner area meeting said inner surface;

d) said inner surface having a radius of curvature defining an arc from said stem lower end to said hook tip inner area of less than 180°;
e) said hook tip inner area being spaced from said stem lower end a distance substantially the same as the diameter of the hook portion so that a pipe of substantially the same diameter is cradled in said hook portion;
f) a tooth extending outwardly and downwardly from said stem adjacent said stem lower end and having a tooth end terminating in a position above an area encircled by said hook portion, said tooth end and said hook tip inner area being spaced a distance less than the diameter of said pipe so that there is a snap fit between said tooth end and said hook tip inner area as said pipe is urged therebetween and into a retained, cradling relation in said hook portion; and
g) wherein said tooth has an upper flat shoulder joining said stem at a right angle for abutting a squared bottom support beam.

20. A pipe hanger comprising:
a) an elongate stem joined to a lower hook portion of a cradle shape, said stem having holes therethrough for nailing to a support and having an upper end and with a lower end joining said hook portion;
b) said hook portion being sized to substantially cradle a pipe of selected radius to be retained by said hook portion, thereby providing said hook portion with a diameter;
c) said hook portion terminating in a hook tip; and
d) a tooth extending outwardly from said stem adjacent said stem lower end and having a tooth end terminating in a position above an area encompassed by said hook portion, said tooth end and a portion of said hook tip contacting said pipe being spaced a distance less than the diameter of said pipe so that there is a snap fit between said tooth end and said hook tip portion as said pipe is urged therebetween and into a retained, cradling relation in said hook portion, wherein said tooth has a first section extending angularly downwardly and a tip section joined to said first section and extending further downwardly at an angle steeper than said first section, and wherein said tooth has hinge portions respectively located between said first section and said stem and between said first section and said tip section.

21. A pipe hanger comprising:
a) an elongate stem joined to a flexible, curved, substantially semicircular lower hook portion to form a J-shaped body, said stem having holes therethrough for nailing to a support and having an upper end and with a lower end joining said lower hook portion at a hook juncture;
b) said hook portion having an inner surface with a radius of curvature of approximately the same as that of a pipe of selected radius to be retained by said hook portion;
c) said hook portion terminating in a hook tip with an inner area meeting said inner surface;
d) said inner surface having a radius of curvature defining an arc from said hook juncture to said hook tip inner area of less than 180°;
e) said hook tip inner area being spaced from said stem lower end a distance substantially the same as the diameter of the hook portion so that a pipe of substantially the same diameter is cradled in said hook portion; and
f) an extended and retractable tooth extending from said stem in substantially perpendicular relation thereto and above said hook juncture, said tooth including a pin which is spring biased to an outward position extending over said pipe.

22. A pipe hanger comprising:
a) an elongate stem joined to a lower hook portion of a cradle shape, said stem having holes therethrough for nailing to a support and having an upper end and with a lower end joining said hook portion at a hook juncture;
b) said hook portion being sized to substantially cradle a pipe of selected radius to be retained by said hook portion, thereby providing said hook portion with a diameter;
c) said hook portion terminating in a hook tip; and
d) a tooth extending outwardly of said stem and inwardly toward said hook portion, said tooth originating from said stem adjacent lower end at a point above and separate from said hook juncture and protruding angularly downwardly to a tooth end, said tooth end and a portion of said hook tip contacting said pipe being spaced a distance less than the diameter of said pipe so that there is a snap fit between said tooth end and said hook tip portion as said pipe is urged therebetween and into a retained, cradling relation in said hook portion.

23. A pipe hanger comprising:
a) an elongate stem joined to a lower hook portion of a cradle shape, said stem having holes therethrough for nailing to a support and having an upper end and with a lower end joining said hook portion;
b) said hook portion being sized to cradle a pipe of selected radius to be retained by said hook portion;
c) said hook portion terminating in a hook tip; and
d) a tooth extending outwardly from a sleeve slidably mounted on said stem lower end and movable into engagement with a pipe held in said hook portion.

24. A pipe hanger comprising:
a) an elongate stem joined to a lower hook portion of a cradle shape, said stem having holes therethrough for nailing to a support and having an upper end and with a lower end joining said hook portion;
b) said hook portion being sized to cradle a pipe of selected radius to be retained by said hook portion;
c) said hook portion terminating in a hook tip; and
d) a tooth extending outwardly from a slide means movably mounted on said stem lower end and movable into engagement with a pipe held in said hook portion.

* * * * *